US007434502B2

(12) United States Patent
Keeton et al.

(10) Patent No.: US 7,434,502 B2
(45) Date of Patent: Oct. 14, 2008

(54) BAR KNOB WITH CAM-OPERATED LOCKING MECHANISM

(75) Inventors: William B. Keeton, Nash, TX (US); Paul A. Warfel, Texarkana, TX (US)

(73) Assignee: Husqvarna Outdoor Products Inc., Augusta, GA (US)

( * ) Notice: Subject to any disclaimer, the term of this patent is extended or adjusted under 35 U.S.C. 154(b) by 333 days.

(21) Appl. No.: 10/896,581

(22) Filed: Jul. 21, 2004

(65) Prior Publication Data

US 2006/0016081 A1 Jan. 26, 2006

(51) Int. Cl.
*B23D 57/02* (2006.01)

(52) U.S. Cl. .......................................... 83/816; 30/386

(58) Field of Classification Search .................. 30/385, 30/386; 83/816
See application file for complete search history.

(56) References Cited

U.S. PATENT DOCUMENTS 4,129,943 A 12/1978 Bricker
4,315,370 A 2/1982 Horne
4,316,327 A 2/1982 Scott et al.
4,835,868 A 6/1989 Nagashima
5,144,751 A 9/1992 Weber
5,491,899 A 2/1996 Schliemann et al.
5,522,143 A 6/1996 Schliemann et al.
5,896,670 A 4/1999 Gibson et al.
5,983,508 A 11/1999 Sundstrom
6,032,373 A 3/2000 Peterson
6,061,915 A 5/2000 Seigneur et al.
6,473,975 B1 11/2002 Sellmann
6,493,949 B2 12/2002 Kondo et al.
6,560,879 B2 5/2003 Franke et al.
6,564,459 B1 5/2003 Steinbrueck et al.
6,782,627 B2 * 8/2004 Hermes et al. ................ 30/386
6,877,233 B1 * 4/2005 Franke ........................ 30/386
2001/0042311 A1 11/2001 Kondo et al.
2002/0124421 A1 9/2002 Hermes et al.
2006/0207111 A1 * 9/2006 Sugishita .................... 30/386

FOREIGN PATENT DOCUMENTS

EP 1 557 247 A 7/2005
WO WO 2004/103657 12/2004

* cited by examiner

*Primary Examiner*—Kenneth E. Peterson
(74) *Attorney, Agent, or Firm*—Pearne & Gordon LLP

(57) ABSTRACT

A chain saw includes a retaining assembly for a tensioning arrangement for adjusting the tension of the cutting chain in the chain saw. The retaining assembly includes a rotatable knob for operation with the chain saw's engine chassis, clutch cover, and guide bar and is rotatable about an axis of rotation between a tightening position for holding the guide bar in place and a loosening position enabling the guide bar to be repositioned whereby the tension in the cutting chain is adjusted. A locking mechanism is provided for locking and unlocking the knob. When the locking mechanism is in a locking position, moveable engagement points of the locking mechanism extended beyond the confines of the knob and engage fixed engagement points. When the locking mechanism is in the unlocking position, the moveable engagement points, having moved inwardly of the confines of the knob, are disengaged from the fixed engagement points.

16 Claims, 10 Drawing Sheets

BAR KNOB WITH CAM-OPERATED LOCKING MECHANISM

FIELD OF THE INVENTION

The present invention relates to a retaining assembly for a tensioning arrangement for periodically adjusting the tension of an endless cutting chain on the guide bar of a chain saw.

BACKGROUND OF THE INVENTION

The cutting chain of a chain saw, eventually, will become loose on the chain saw's guide bar after use because of factors, such as wear, that result in elongation of the chain. Several chain saw constructions and associated methods exist to move the guide bar longitudinally away from the drive sprocket of the chain saw to remove slack from the cutting chain and apply the requisite tension to the cutting chain. This ensures that the links of the cutting chain remain snuggly seated in a peripheral channel in the guide bar.

A number of tensioning arrangements and associated methods for adjusting the tension of the cutting chain on the guide bar are known. Typically, retaining assemblies are provided for the tensioning arrangements. The retaining assemblies function so as to hold the guide bars in place. When it is necessary to reposition the guide bar and adjust the tension of the cutting chain, the retaining assembly is loosened so that the guide bar can be moved longitudinally from the drive sprocket to increase the tension in the cutting chain. Thereafter, the retaining assembly is retightened to secure the guide bar in its adjusted position. In some instances, separate tools are required to loosen and tighten the retaining assemblies. In other cases the retaining assemblies include means for their loosening and tightening and separate tools are not required. Additionally, in certain constructions and associated methods, screws, hydraulic pistons or eccentric working parts are integrated into the chain saw and are employed to, essentially, automatically move the guide bar and increase the tension in the cutting chain when the retaining assembly is loosened. In other instances, the guide bar is manually repositioned by the operator grasping and moving the guide bar to its adjusted position.

SUMMARY OF THE INVENTION

The present invention relates to a retaining assembly for a tensioning arrangement for adjusting the tension of a cutting chain of a chain saw. The retaining assembly can be loosened and tightened without the need to use separate tools to enable the chain saw guide bar on which the cutting chain is mounted to be moved and repositioned, thereby adjusting the tension of the cutting chain. The retaining assembly includes a locking mechanism for preventing accidental loosening of the retaining assembly. In accordance with one aspect, the present invention provides a retaining assembly for a tensioning arrangement for adjusting the tension of a cutting chain of a chain saw having an engine chassis, a clutch cover, and a guide bar for the cutting chain. The retaining assembly includes a rotatable knob that is operatively cooperative with the engine chassis, the clutch cover, and the guide bar, whereby the knob may be rotated about a rotational axis between a tightened position, in which the guide bar is fixed on place between the engine chassis and the clutch cover, and a loosened position, in which the guide bar is loosened and may be repositioned using the tensioning arrangement so as to adjust the tension of the cutting chain on the guide bar. A plurality of engagement points fixed relative to the clutch cover are provided. The rotatable knob is connected to a locking mechanism for alternatively locking the rotatable knob against rotation about its rotational axis and unlocking the rotatable knob to enable the rotatable knob to be rotated about its rotational axis. The locking mechanism includes a plurality of movable engagement points and means for moving the movable engagement points alternatively outwardly and inwardly of the confines of the rotatable knob into and out of engagement, respectively, with the engagement points fixed relative to the clutch cover. When the moveable engagement points are in engagement with the engagement points that are fixed relative to the clutch cover, the rotatable knob is locked against rotation about its rotational axis. When the moveable engagement points are out of engagement with the engagement points that are fixed relative to the clutch cover, the rotatable knob is unlocked so that it can be rotated about its rotational axis.

In accordance with another aspect of the invention, the means for moving the moveable engagement points moves the movable engagement points alternatively radially outwardly and inwardly of, and substantially perpendicularly to, the rotational axis of the rotatable knob into and out of engagement, respectively, with the engagement points fixed relative to the clutch cover.

In accordance with yet another aspect of the invention, the locking mechanism includes a lock on which the movable engagement points are located. The lock is slidably mounted within the rotatable knob for alternative movement radially outwardly and inwardly of, and substantially perpendicularly to, the rotational axis of the rotational knob, whereby the movable engagement points are, respectively, extended beyond the confines of the rotatable knob and into engagement with the engagement points fixed relative to the clutch cover and retracted within the confines of the rotatable knob and out of engagement with the engagement points fixed relative to the clutch cover.

According to still another aspect of the invention, the locking mechanism includes a lever having a portion in contact with the lock. The lever is mounted to the rotatable knob such that movement of the lever in a first direction causes the portion of the lever in contact with the lock to move the lock radially outwardly of the rotational axis of the rotatable knob whereby the moveable engagement points on the lock are placed into engagement with the engagement points fixed relative to the clutch cover. Alternatively, movement of the lever in a second direction causes the portion of the lever in contact with the lock to move radially inwardly of the rotational axis of the rotatable knob whereby the lock also moves radially inwardly of the rotational axis of the rotatable knob to take the moveable engagement points on the lock out of engagement with the engagement points fixed relative to the clutch cover.

According to yet a further aspect, the lever has an end portion pivotally connected to the rotatable knob for pivotal movement of the lever between the first and the second directions and the portion of the lever in contact with the lock comprises a cam. The cam moves the lock radially outwardly of the rotational axis of the rotatable knob to dispose the movable engagement points on the lock into engagement with the engagement points fixed relative to the clutch cover when the lever is moved in the first direction. When the lever is moved in the second direction, the cam allows the lock to move radially inwardly of the rotational axis of the rotatable knob to dispose the moveable engagement points on the lock out of engagement with the engagement points fixed relative to the clutch cover. In a particular aspect of the invention, a resilient means, such as a spring, is in contact with the lock and the rotatable knob for continually urging the lock radially inwardly of the rotational axis of the rotatable knob.

According to another aspect of the invention, the moveable engagement points are slidably positioned on the lock for independent movement in relation to the lock in the same radial outward and radial inward direction as the respective radial outward and radial inward movement of the lock. Resilient means, such as a spring, is provided in contact with the lock and the moveable engagement points for continually urging the moveable engagement points in the radial outward direction in relation to the lock.

DESCRIPTION OF AN EXAMPLE EMBODIMENT

Figure 1:
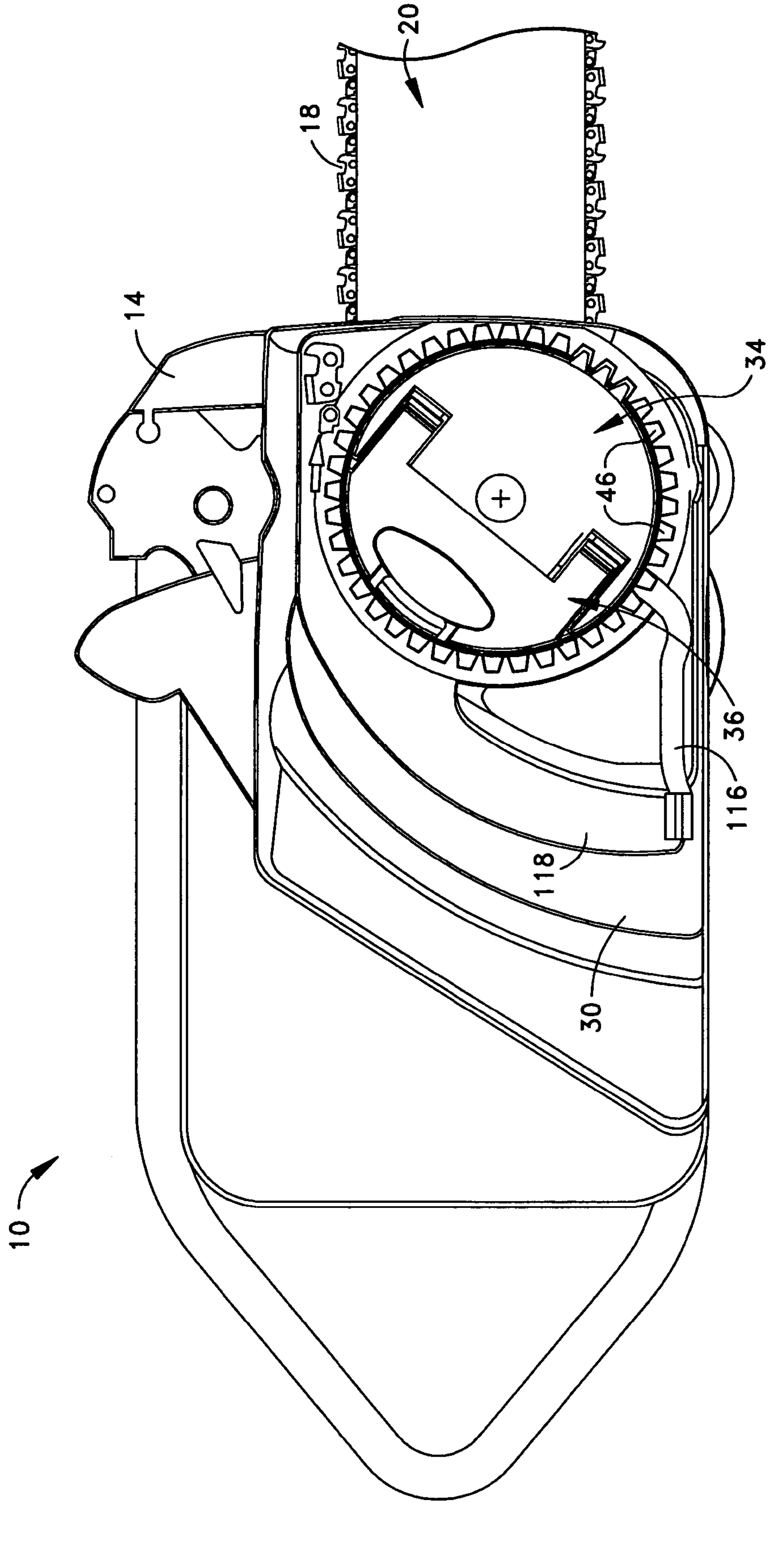
FIG. 1 is a side elevational view of a portion of a chain saw that includes an example of the present invention.
Figure 2:
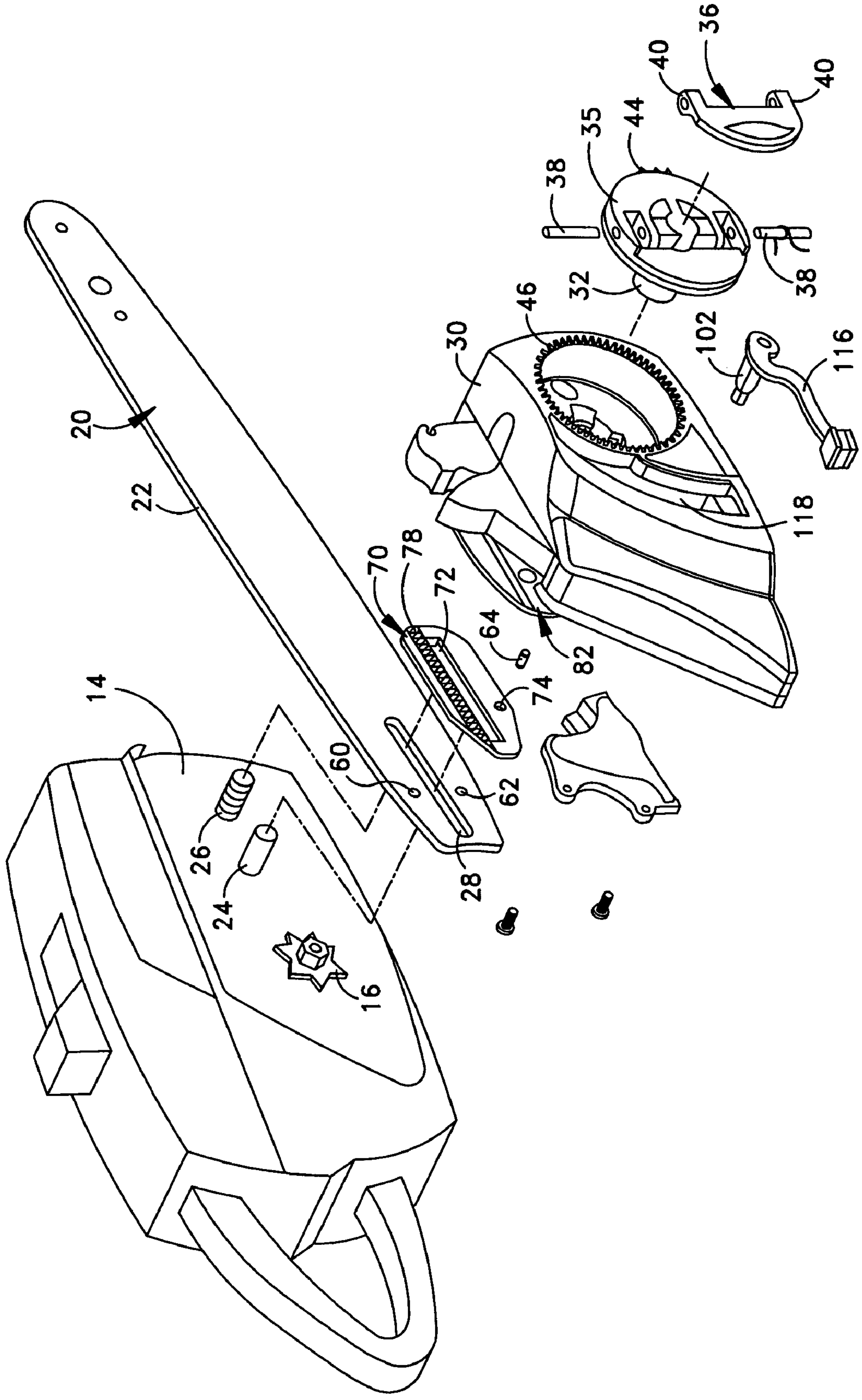
FIG. 2 is an exploded perspective view of the chain saw of FIG. 1 looking toward the engine chassis of the saw.

FIGS. 1 and 2 illustrate a chain saw 10 that includes an example of a retaining assembly 34 (FIG. 1) for a tensioning arrangement for adjusting the tension of the chain saw's endless cutting chain 18 (FIG. 1) in accordance with the present invention. The chain saw 10 includes an engine chassis 14 for an engine (not shown), a clutch cover 30 and a guide bar 20 for the cutting chain 18. As will be understood, the engine powers a drive sprocket 16 (FIG. 2) attached to the drive shaft of the engine. The drive sprocket 16 engages the links of the cutting chain 18 and propels the cutting chain around the guide bar 20 (FIG. 1).

The guide bar 20 has the configuration of an elongated plate with a channel or groove 22 (FIG. 2) around its periphery and an idler sprocket (not shown) at its distal end in which the links of the cutting chain 18 ride. Parallel pins, or studs, 24 and 26 are affixed to the chassis 14 and lie in a common plane that is, generally, horizontally arranged when the chain saw is resting on a horizontal surface. The pins 24 and 26 extend perpendicularly from the chassis 14 through an elongated horizontal slot 28 in the guide bar 20 with a sliding fit and align the guide bar 20 to the chassis 14. Because the spacing between the pins 24 and 26 is considerably less than the length of the slot 28, the guide bar is able to slide horizontally on the pins for the purpose of repositioning the guide bar on the pins and adjusting the tension in the cutting chain 18 as described below.

The clutch cover 30 is made of any suitable material, such as a molded plastic or a die cast metal, and provides a housing for certain of the components that alternatively hold the guide bar 20 in place and release it for the purpose of allowing the guide bar 20 to be repositioned whereby the tension in the cutting chain 18 may be adjusted. The clutch cover 30 is tightened and loosened against the engine chassis 14 by the retaining assembly 34 (FIG. 1) for the purpose of fixing the guide bar 20 in place and releasing it, respectively. In this connection, the clutch cover 30 is removably attached to the threaded pin 26 on the engine chassis 14 by means of a knob 35 (FIG. 2) that comprises a component of the retaining assembly 34. Raised nodules or pins (not shown) may be provided on the inner facing of the clutch cover 30 to align with slots in the chassis 14 to assist in the positioning of the clutch cover and the chassis with respect to one another.

In the embodiment of the invention illustrated in the drawings, the knob 35 includes a stem 32 (FIG. 2) that is internally threaded and by means of which the knob 35 is threaded onto the threaded pin 26 so as to attach the clutch cover 30 to the chassis 14. The knob 35 and associated stem 32 are rotatable about an axis of rotation that extends through the lengths of stem 32 and pin 26 between a tightened position, where the guide bar 20 is held in a fixed position between the chassis 14 and the clutch cover 30, and a loosened position, where the guide bar is able to be moved longitudinally and repositioned. The repositioning is accomplished by the cooperative arrangement of slot 28 in the guide bar 20 and the pins 24 and 26. As will be understood from the foregoing description, the rotatable knob 35 is operatively cooperative with the engine chassis 14, the clutch cover 30 and the guide bar 18 whereby the knob may be rotated about its rotational axis between a tightened position, in which the guide bar is fixed in place between the engine chassis 14 and the clutch cover 30 and a loosened position in which the guide bar is loosened and may be repositioned using a tensioning arrangement so as to adjust the tension of the cutting chain 18 on the guide bar 20.

Figure 3:
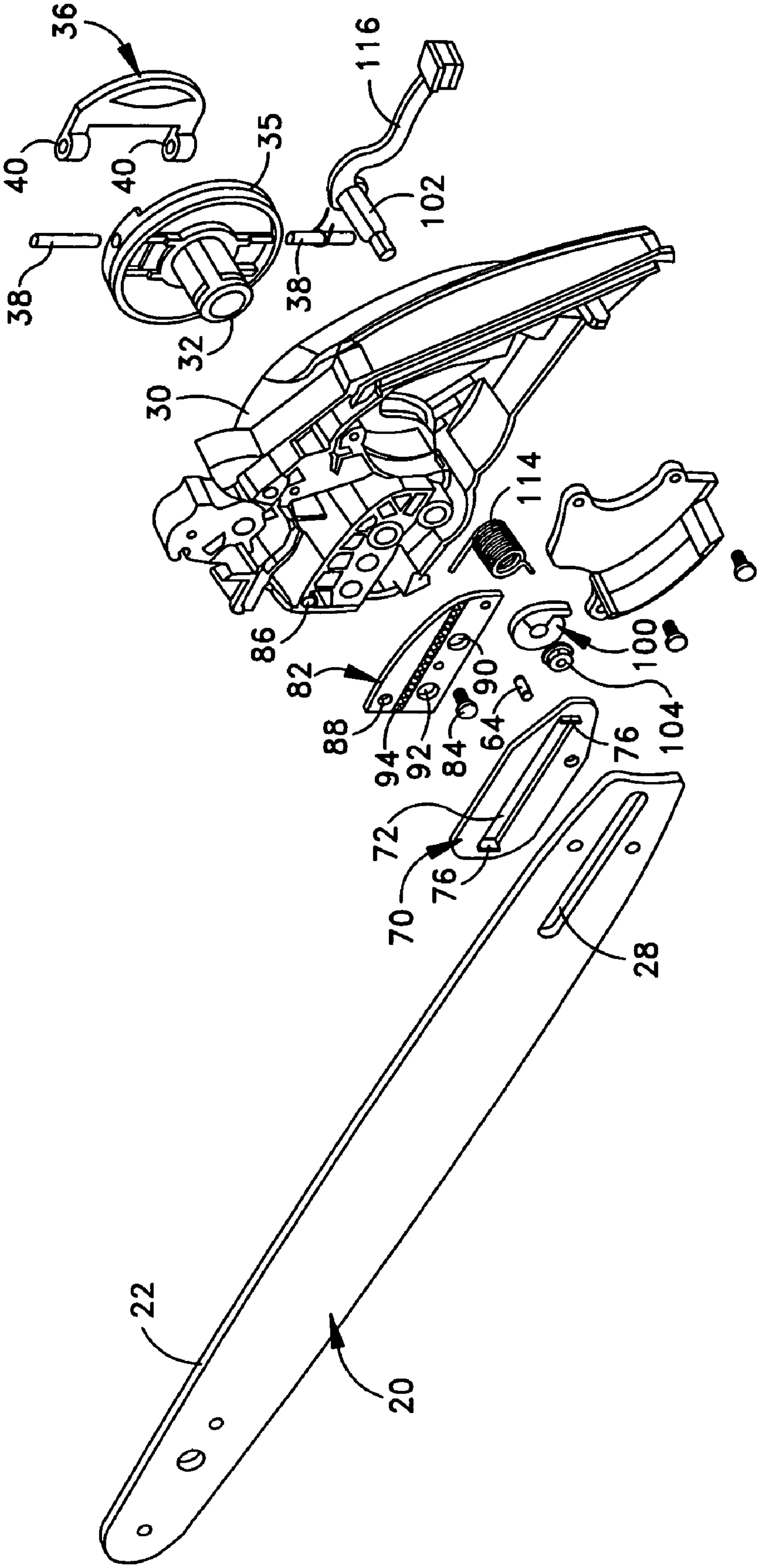
FIG. 3 is an exploded perspective view of some of the chain saw parts of the chain saw of FIG. 1 looking away from the engine chassis of the saw.
Figure 4:
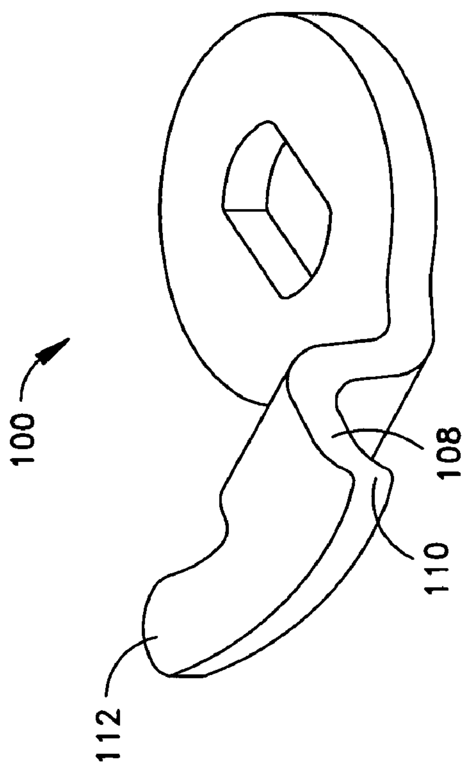
FIG. 4 is an enlarged perspective view of a chain tensioner cam used in an embodiment of the invention.
Figure 7:
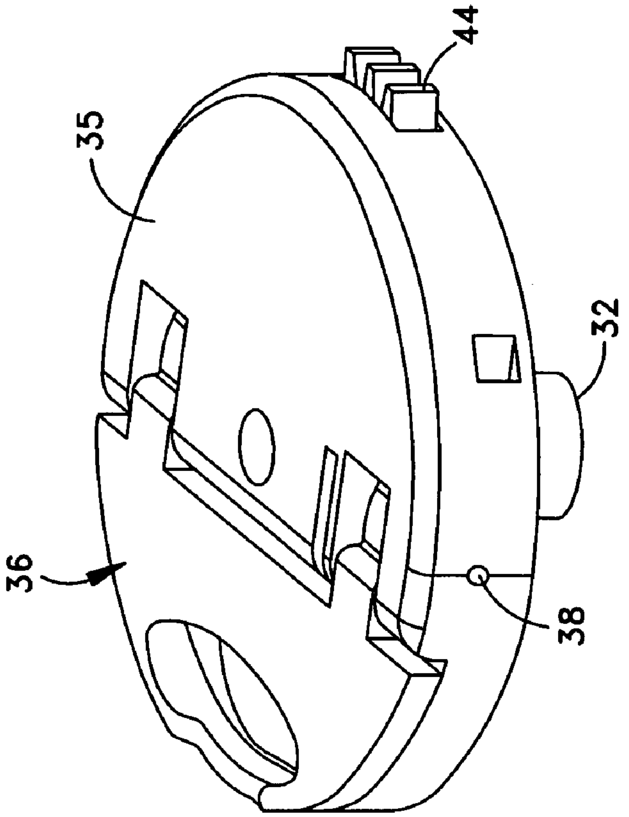
FIG. 7 is a perspective view of the rotatable knob and locking mechanism of FIG. 6 with the locking mechanism shown in a position for locking the rotatable knob against rotation about its rotational axis.
Figure 6:
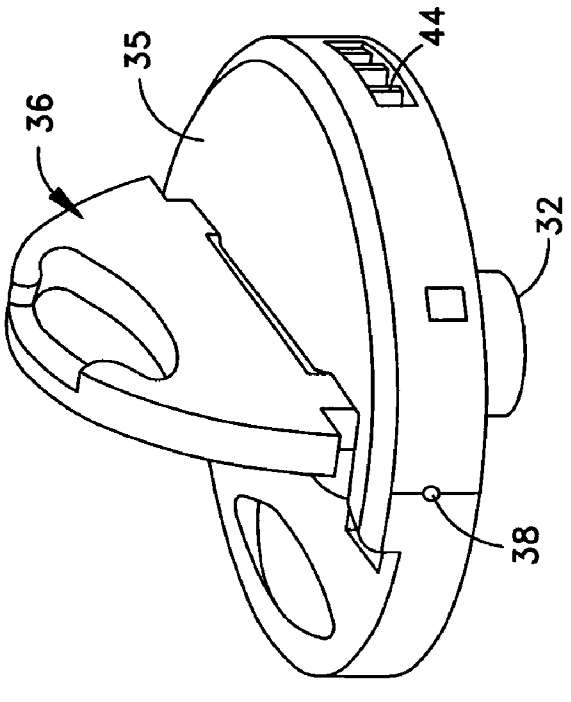
FIG. 6 is a perspective view of the rotatable knob of the retaining assembly for loosening and tightening the chain saw guide bar between the engine chassis and clutch cover, with a first embodiment of the locking mechanism for the retaining assembly shown in a position enabling the rotatable knob to be rotated about its rotational axis.

The retaining assembly, in addition to rotatable knob 35 and its associated stem 32, includes a locking mechanism that is connected to knob 35 for alternatively locking the knob against rotation about its rotational axis and unlocking the knob, enabling the knob to be rotated about its axis of rotation. The locking mechanism includes a lever 36 (FIG. 1) that is pivotally mounted on the knob 35 by means of pins 38 (FIGS. 2 and 3). Each pin 38 extends through a respective end portion 40 of the lever 36. The lever 36 is pivotable from a collapsed, or lowered, position (FIG. 7) where the knob 35 is locked against rotational movement about its rotational axis, to a raised position (FIG. 6), where the knob 35 is unlocked and is free to rotate about its rotational axis. As will be understood, the lever 36 provides the chain saw operator with a convenient means that can be easily grasped and with which leverage can be applied to rotatable knob 35 for tightening and loosening of the knob.

Figure 9:
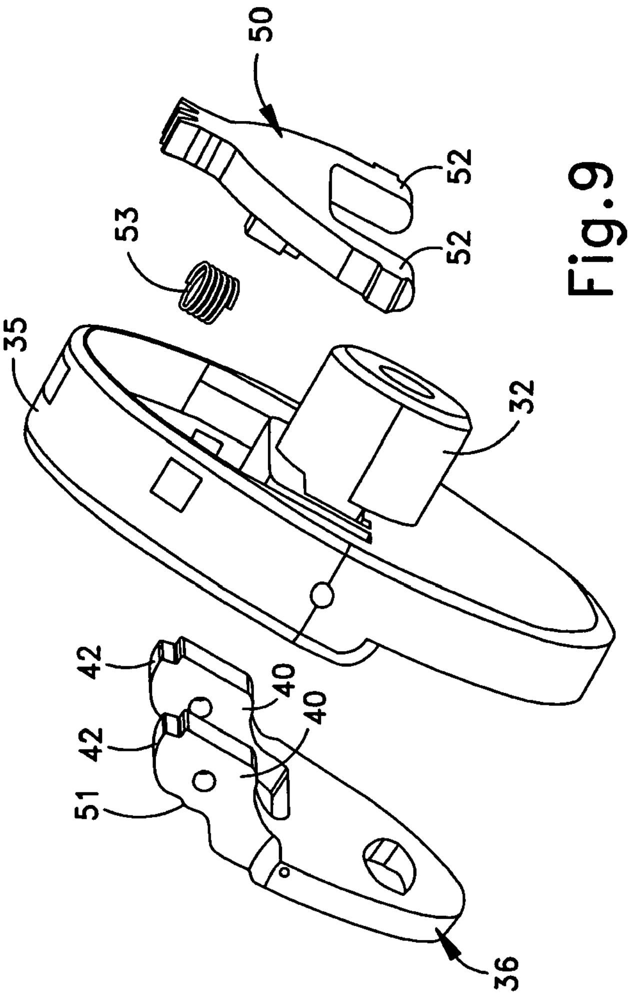
FIG. 9 is an exploded perspective view of the rotatable knob and locking mechanism of FIGS. 6, 7 and 8.
Figure 8:
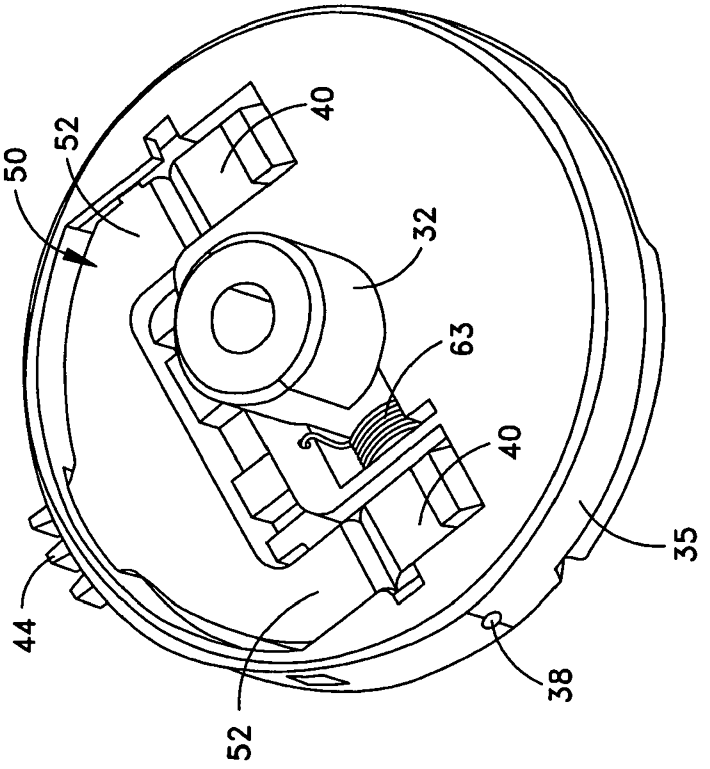
FIG. 8 is a perspective view of the rotatable knob and locking mechanism in the same relative positions as shown in FIG. 7 but viewed from the side of the rotatable knob that faces the chain saw's clutch cover.
Figure 10:
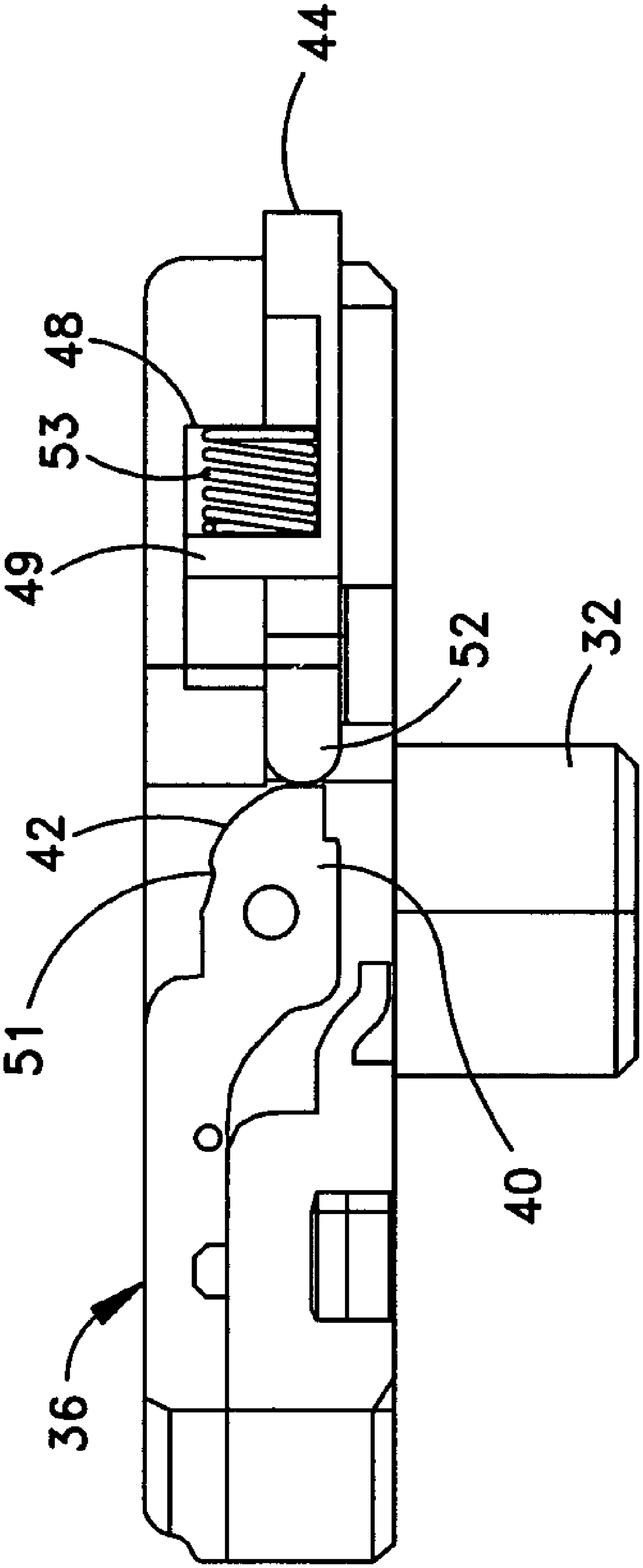
FIG. 10 is a cross-sectional view of the rotatable knob and locking mechanism of FIGS. 6, 7, 8 and 9 with the locking mechanism shown in a position locking the rotatable knob against rotation about its rotational axis.

The locking of the knob 35 against rotational movement and the freeing of the knob for rotational movement are accomplished by the cooperative arrangement of the lever 36 and a lock 50 that comprises an additional component of the locking mechanism. As best seen in FIGS. 8 and 9, the lock 50, generally, has the shape of a yoke and is slidably received within the knob 35. A plurality of moveable engagement points 44, in the form of protrusions or teeth, are located at the crest of the yoke and the two terminal portions 52 of the lock 50 abut respective end portions 40 of the lever 36. As best illustrated in FIG. 10, a coil spring 53 is located between a wall 48 formed by a recess in the knob 35 and an abutment 49 formed by a recess in the lock 50 and continually applies a force to the lock urging it radially inwardly, and substantially perpendicularly, of the rotational axis of the knob 35.

Each of the end portions 40 of the lever 36 includes an eccentric surface, or cam 42, that is in engagement with a respective terminal portion 52 of the lock 50. As can be seen from FIG. 10, when the lever 36 is in a lowered position the cam 42 of each of the end portions 40 of the lever 36 bears against a respective terminal portion 52 of the lock 50, causing the lock 50 to move radially outwardly, and substantially perpendicularly, of the rotational axis of the knob 35 against the force of coil spring 53. In this mode, the engagement points 44 of the lock 50 are moved radially outwardly of the perimeter, or confines, of the knob 35. Conversely, when the lever 36 is in a raised position, as show in FIG. 6, the cam 42 of each of the end portions 40 of the lever 36 will be rotated away from a respective terminal portion 52 of the lock 50 so that the coil spring 53 can force the lock 50 radially inwardly of the rotational axis of knob 35. In this alternative mode, the engagement points 44 of the lock 50 will move radially inwardly of the confines of the knob 35.

Depressions 51 are provided in the cams 42 of the lever 36 at a location such that, when the lever 36 is in a raised position, each terminal portion 52 of the lock 50 will rest in a respective depression so as to maintain the lever 36 in a raised position against the force of the lever spring 63 which is fixed at one end to the knob 35 and at its other end to the lever 36 so as to bias the lever 36 toward the lowered position. With the lever 36 in the raised position, the lever can be easily grasped and the knob 35 can be caused to rotate (i.e., between the tightened and loosened positions) without the use of additional tools.

The clutch cover 30 (FIG. 2) is provided with a series of fixed engagement points 46 that are of a configuration such that they can interact with the engagement points 44 on the lock 50 to lock the rotatable knob 35 against movement about its rotational axis. In the illustrated embodiment of the invention, the engagement points 46 constitute notches around the entire periphery of a recessed portion of the clutch cover 30 (FIG. 2). It is to be appreciated that the engagement points 44 on the lock 50 and the engagement points 46 on the clutch cover 30 may have different shapes, configurations, etc. than are shown in the drawings.

When the lever 36 is in the locking position (FIG. 7), the engagement points 44 on the lock 50 will be engaged with complementary engagement points 46 on the clutch cover 30 as shown in FIG. 1, thereby securing the knob 35 in a fixed position, preventing inadvertent turning and loosening of the knob 35 as a result of bumps or vibrations. When the lever 36 is pivoted to the unlocking position (FIG. 6), the engagement points 44 disengage from the fixed engagement points 46, allowing the knob 35 to be rotated about its rotational axis relative to the clutch cover 30 for loosening and tightening of the guide bar 20 between the chassis 14 and the cover 30. As will be understood from the foregoing description, in the embodiment of the invention shown in the drawings, the lever 36, with its cams 42, the lock 50, with its moveable engagement points 44, and the spring 53 comprise means for moving the moveable engagement points 44 alternatively outwardly and inwardly of the confines of the rotatable knob 35 into and out of engagement, respectively, with the engagement points 46 that are fixed relative to the clutch cover. In the embodiment of the invention shown in the drawings, the means for moving the movable engagement points moves the movable engagement points 46 alternatively radially outwardly and inwardly of, and substantially perpendicularly to, the rotational axis of the rotational knob 35 into and out of engagement with the engagement points 46.

The embodiment of the invention shown in the drawings is configured such that the engagement points 44 on the lock 50 and the engagement points 46 on the clutch cover 30 are visible by the chain saw operator. This allows for the convenient aligning of the engagement points 44 and 46 and enables the operator to determine whether the engagement points 44 and 46 are engaged. However, there will be instances where the engagement points 44 and 46 are not aligned as precisely as required and the engagement points will be jammed against one another. To prevent damage to the engagement points in such instances, a second embodiment of the locking mechanism is provided.

Figure 12:
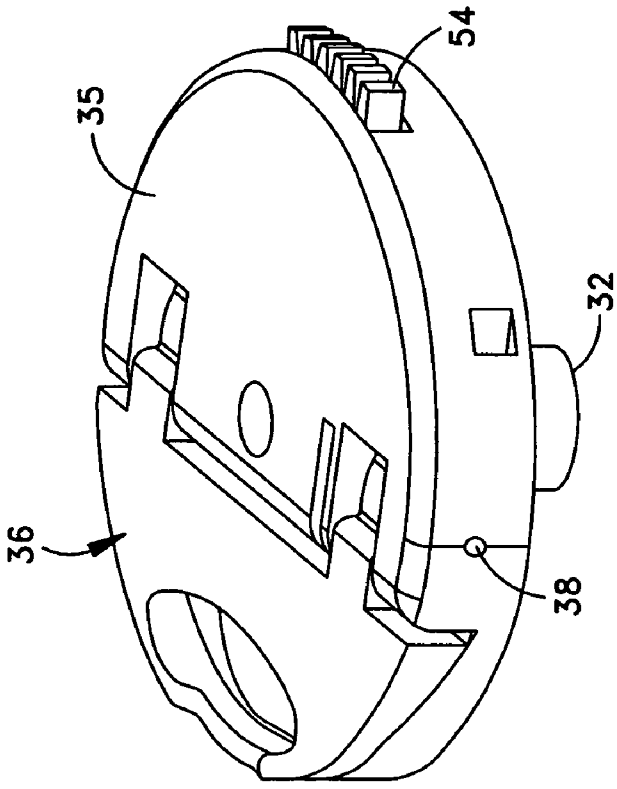
FIG. 12 is a perspective view of the rotatable knob and locking mechanism of FIG. 11 with the locking mechanism shown in a position for locking the rotatable knob against rotation about its rotational axis.
Figure 14:
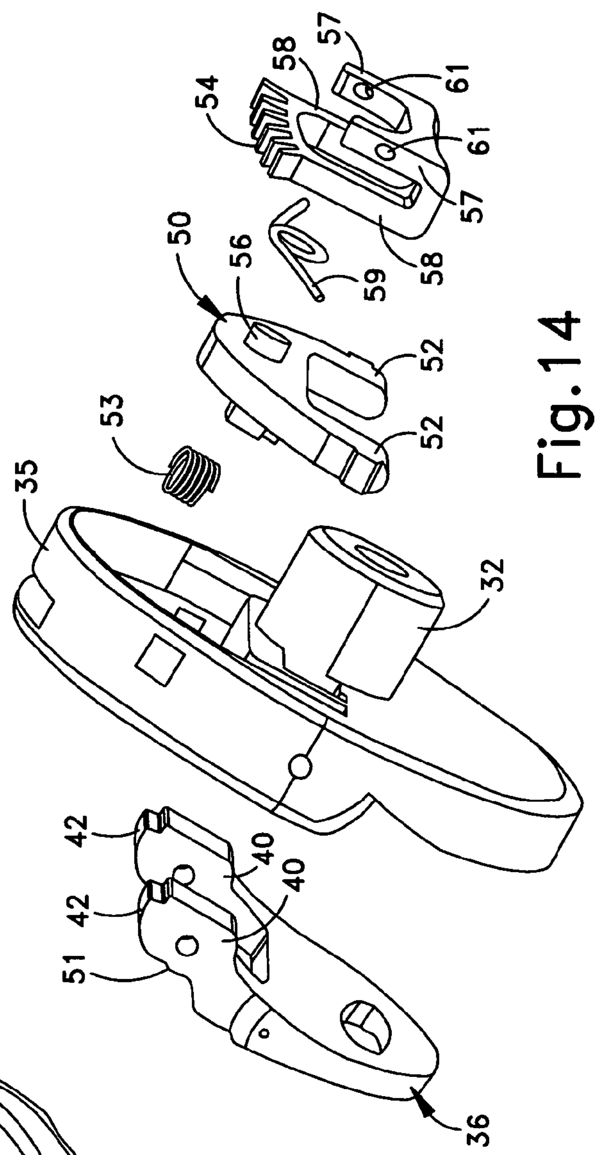
FIG. 14 is an exploded perspective view of the rotatable knob and locking mechanism of FIGS. 11, 12 and 13.
Figure 13:
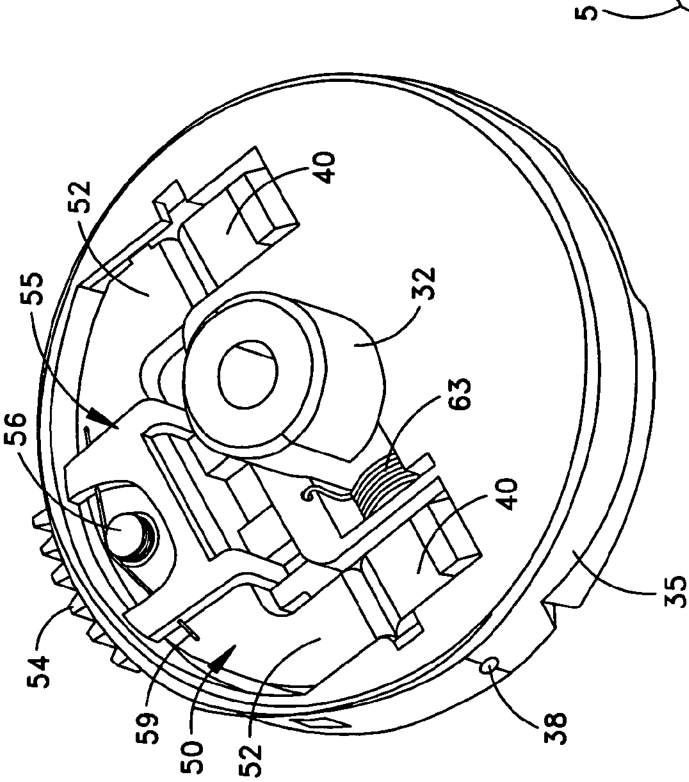
FIG. 13 is a perspective view of the rotatable knob and locking mechanism in the same relative positions as shown in FIG. 12 but viewed from the side of the rotatable knob that faces the chain saw's clutch cover.
Figure 15:
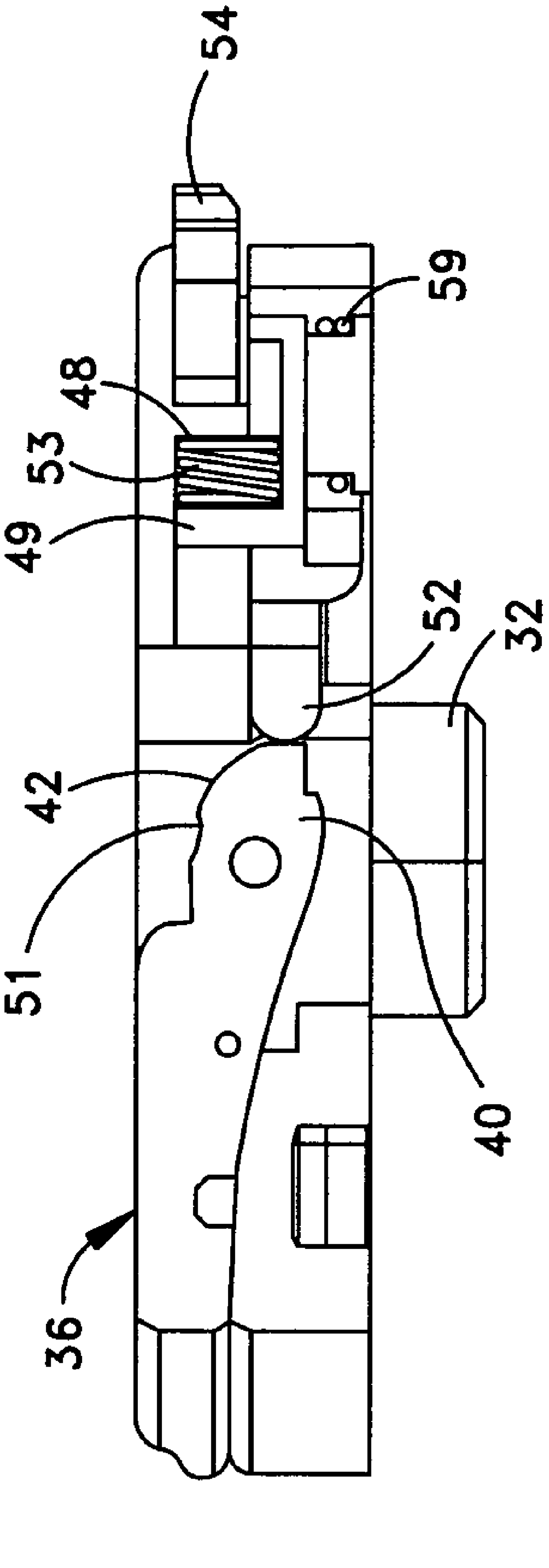
FIG. 15 is a cross-sectional view of the rotatable knob and locking mechanism of FIGS. 11, 12, 13 and 14 with the locking mechanism shown in a position locking the rotatable knob against rotation about its rotational axis.

The second embodiment of the locking mechanism is illustrated in FIGS. 11 through 15 in which the same reference numbers are used as in FIGS. 6 through 10 to identify parts and components that are included in both the first and second embodiments of the locking mechanism. In the second embodiment, the lever 36 and the lock 50 are provided in a cooperative relationship within the knob 35 in much the same manner as described above with respect to the first embodiment of the locking mechanism illustrated in FIGS. 6 through 10. In the second embodiment, however, the engagement points are not incorporated directly into the lock 50. Instead, as shown in FIGS. 13 through 15, the engagement points 54 are situated on a floating support 55 that is slidably mounted on the lock 50. In this case, the lock 50 includes an anchoring pin 56 and is slidably located between the arms 57 and 58 of the floating support 55. A spring 59 encircles pin 56 and has two ends that are positioned within openings 61 in arms 57 of the floating support 55. It will be understood that the spring 59 biases the floating support 55 in a direction radially outwardly of the lock 50 but a force applied to the engagement points 44 of the support 55 can cause the support to slide radially inwardly of the lock 50.

Figure 11:
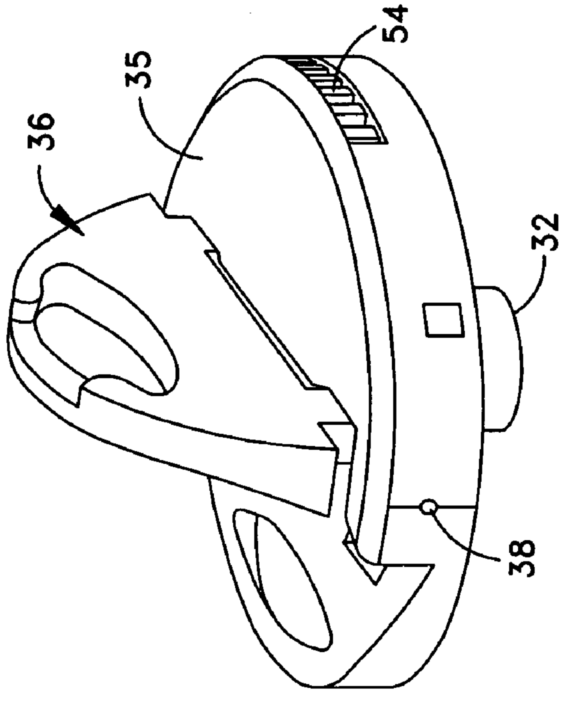
FIG. 11 is a perspective view of the rotatable knob of the retaining assembly for loosening and tightening the chain saw guide bar between the engine chassis and clutch cover, with a second embodiment of the locking mechanism for the retaining assembly shown in a position enabling the rotatable knob to be rotated about its rotational axis.

The operation of the second embodiment of the locking mechanism is, largely, the same as the operation of the first embodiment of the locking mechanism. Thus, as can be seen from FIGS. 11 through 15, when the lever 36 is in a lowered position, the cam 42 of each of the end sections 40 of the lever 36 bear against a respective terminal section 52 of the lock 50 causing the lock to move radially outwardly of the rotational axis of the knob 35 against the compressive force of coil spring 53. In so moving, the lock 50 will carry with it the floating support 55 so that the engagement points 54 situated on the support 55 will protrude beyond the confines of the knob 35 as shown in FIGS. 12 and 15. Conversely, when the lever 36 is pivoted against the force of spring 63 to a raised position as shown in FIG. 11, the cam 42 of each of the end sections 40 of the lever 36 will be located such that the coil spring 53 can force the lock 50 and, with the lock, the floating support 55 inwardly of the confines of the knob 35 to a point where the engagement points 54 situated on the support 55 are retracted from outside the confines of the knob 35.

Thus, it can be seen that difference in the second embodiment of the locking mechanism with respect to the first embodiment resides in the fact that the engagement points 54 are situated on the support 55 that is slidably mounted on the lock 50. Because of this arrangement, when it is desired to lock the knob 35 to the clutch cover 30, and the lever 36 is placed in a lowered position as shown in FIG. 12, should the knob 35 be positioned such that the engagement points 54 do not properly mesh with the engagement points 46 of the clutch cover, the floating support 55 and engagement points 54 will be forced radially inwardly of the knob 35. If there is only a slight misalignment of the engagement points 54 and 46, but the locking function is not significantly comprised, no adjustment need be made. However, if a serious misalignment occurs and the locking function is seriously comprised, the knob 35 can be rotated slightly so that the engagement points 54 and 46 are in satisfactory alignment.

Turning back to the aspect of repositioning the guide bar 20 so as to adjust the tension in the cutting chain 18, it will be appreciated that the embodiments of the retaining assembly described above can be utilized with various constructions, configurations, etc. for moving the guide bar. The illustrated embodiment for moving the guide bar 20 contains a particular set of structures; however, these structures merely provide one example for repositioning the guide bar and the retaining assembly of the invention can be used with other structures.

An example of a tensioning arrangement with which the retaining assembly of the present invention may be employed will now be described. Referring to FIGS. 2 through 5, it can first be seen in FIG. 2 that the elongated horizontal slot 28 in the guide bar 20 allows the guide bar to be repositioned by being moved longitudinally away from the drive sprocket 16 along slot 28 on the pins 24 and 26. This movement of the guide bar 20 takes up any slack in the cutting chain 18 and allows the requisite tension to be applied to the cutting chain. The guide bar 20 has an opening 60 located above the horizontal slot 28 that allows oil from an oiler (not shown) on the engine chassis 14 to provide lubrication to the guide bar and the cutting chain 18 when the chain saw is operating. Located below the slot 28 is a cylindrical opening 62 into which a cylindrical tensioner pin 64, extending perpendicularly from the plane of the guide bar 20, is pressed or otherwise fixed, preferably permanently. As illustrated in FIG. 2, the tensioner pin 64 projects beyond the guide bar 20 by a distance at least equal to the thickness of the guide bar and, preferably, by a distance about at least twice the thickness of the guide bar.

To assist in securing the guide bar 20 in a fixed position when the knob 35 is in the tightened position, a locking plate 70 is utilized. The locking plate has a slot 72 that coincides with the slot 28 in the guide bar 20 and a hole 74 through which the tensioner pin 64 passes. The locking plate 70 is positioned on the guide bar 20 by tabs 76 (FIG. 3) folded through the slot 28. An elongated high-friction surface 78 is provided above the slot 72 on the side of the locking plate 70 facing toward the clutch cover 30. The friction surface 78 may constitute a series of relatively small vertical ridges of triangular cross-section coined into the plate 70.

In the illustrated example, a cover plate 82 (FIG. 3), secured to the clutch cover 30 by a machine screw 84, is positioned to overlie the locking plate 70 by means of at least one molded locator pin 86 on the clutch cover 30 that extends into a respective locator hole 88 in the cover plate 82. Holes 90 and 92 in the cover plate 82 are aligned with and positioned over the pins 24 and 26, respectively, on the chassis 14 to fix the cover plate 82 relative to the chassis. An elongated high friction surface 94 is formed on the cover plate 82, and the friction surface 94 is aligned with the friction surface 78 on the locking plate 70.

In the illustrated example, a cam 100 (FIG. 3) is attached to a pivot pin 102 by a hex-flange locking nut 104 such that the cam is rotationally locked to the pivot pin. The cam 100 (FIG. 4) has a working edge surface 108, a rise area 110 at the outer periphery of the working edge surface, and a trailing section 112. The cam 100 is continuously biased against the tensioner pin 64 (FIGS. 5A-5C) by a torsion spring 114 (FIG. 3). The spring 114 is located in a cavity in the clutch cover 30.

The pivot pin 102 extends through the clutch cover 30 and is connected to an override lever 116 that is operable for manually adjusting the position of the guide bar 20. The override lever 116 is staked or otherwise rigidly attached to an outer end of the pivot pin 102 and is located in a molded override channel 118 on the external face of the clutch cover 30. The override lever 116 is arranged to directly follow the angular movement of the cam 100 as the cam biases the tensioner pin 64 forcing the guide bar 20 longitudinally away from sprocket 16 to remove slack from the cutting chain 18. Nomenclature, embossed or otherwise applied along the side of the override channel, to which the free end of the override lever 116 points, can indicate to the operator when the cutting chain 18 should be replaced. It will be understood that the clutch cover 30 supports the cover plate 82, the cam 100, the pivot pin 102, the lever 116, and the knob 35. It can be seen that other structural details are present on the clutch cover (e.g., see FIGS. 2 and 3), but these other structural details are not a limitation on the present invention.

When the knob 35 is rotated to the tightened position, it tightens the friction surface 94 on the cover plate 82 against the friction surface 78 on the locking plate 70. When these two surfaces are forced together, the tensioner pin 64 is locked against movement and the guide bar 20 is maintained in a fixed position. When the knob 35 is rotated to its loosened position and the pressure of the friction surfaces 78 and 94 are released, the spring-biased cam 100 forces the guide bar 20 forward to a new position, removing slack from the cutting chain 18 after which the knob 35 is rotated to the tightened position so that the guide bar is fixed in place. When the knob 35 is turned fully beyond the loosened position, the clutch cover 30 can be removed from the engine chassis 14. Usually this is done only to replace the cutting chain 18. When the clutch cover 30 is removed from the chassis 14, the cam 100 is released from the tensioner pin 64 and rotates to its most extended position under the influence of spring 114. The trailing section 112 (FIG. 4) of the cam 100, in that case, overlies the end of the tensioner pin 64 on the guide bar 20 if the cam is not first angularly retracted by manually moving the override lever 116 counter-clockwise, as viewed in FIG. 2, against the force of the spring 114. This prevents installation of the clutch cover 30 until the cam 100 is on the proper rearward side of the tensioner pin 64. When the clutch cover 30 is again assembled onto the engine chassis 14, and the override lever 116 is released, the spring-biased cam 100 again biases the tensioner pin 64 moving the guide bar 20 to a position where the cutting chain is once more under, essentially, full tension.

In use, the operator ensures that the knob 35 is fully turned clockwise (as viewed in FIG. 1) and the clutch cover assembly 30 is secured to the chassis 14. In this condition lever 36 is in its downward position and the engagement points 44 and 46 are in engagement. As the chain saw 10 is used, the length of the cutting chain 18 will increase (e.g., the links of the cutting chain will wear at their pin joints). When the operator observes excessive slack in the cutting chain 18, the operator raises the lever 36, disengaging the engagement points 44 from the engagement points 46, and turns the knob 35 to the loosened position around its rotational axis, backing the clutch cover 30 slightly away from the chassis 14. With this action, the friction surface 94 on the cover plate 82 is released from the friction surface 78 on the locking plate 70. At the same time, the spring 114 biases the working edge surface 108 of the cam 100 against the tensioner pin 64, forcing the guide bar 20 longitudinally away from the drive sprocket 16 to a new position so as to remove the slack in the cutting chain 18. The location of the tensioner pin 64 beneath the studs 24 and 26 enables the force applied by the cam 100 to assist in overcoming the moment developed by the overhanging weight of the guide bar 20 and cutting chain 18 and provide for a smooth tensioning movement.

As the above-described adjustment of the guide bar 18 occurs, the override lever 116, which is directly attached to the spring-biased cam 100, moves upward in the override channel 118 to a new position. If need be, the override lever 116 can be manually advanced to assist the spring 114. The indicia associated with the override lever 116 and the override channel 118 indicates the extent to which the cutting chain has been extended. For example, the indicia may include a legend, such as "REPLACE CHAIN" to indicate when the chain has been elongated to the point of needing to be replaced. Such an arrangement is disclosed in U.S. Pat. No. 6,560,879, the entire disclosure of which is incorporated herein by reference.

Figure 5C:
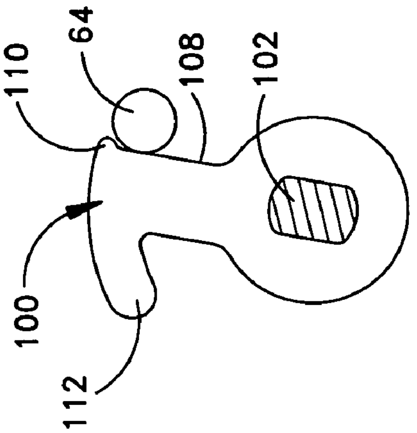
FIGS. 5A, 5B, and 5C are enlarged views of a progressive series of positions of the chain tensioner cam of FIG. 5 shown bearing against a tensioner pin as the cutting chain of the chain saw becomes elongated.
Figure 5B:
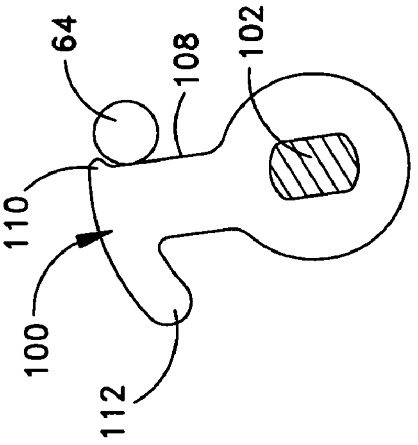
Figure 5A:
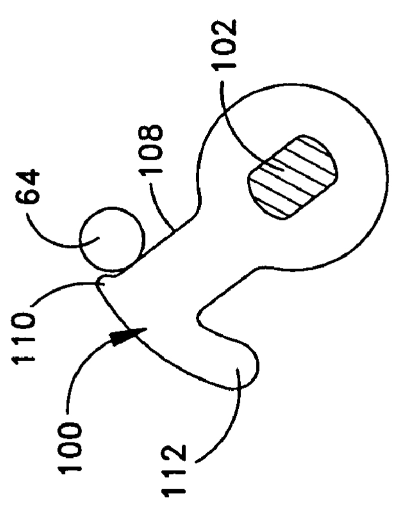

FIGS. 5A-5C illustrate successive positions of the cam 100 as the cutting chain 18 undergoes wear. FIG. 5A represents the position of the cam 100 when the cutting chain 18, essentially, is new. FIG. 5B shows the cam 100 in a mid-position, when the cutting chain has been expended about one-half of its useful life, and FIG. 5C shows the cam in a position where the cutting chain has reached the end of its useful life.

Once the guide bar 20 has been adjusted and the cutting chain 18 has had any slack removed, the knob 35 is rotated back to the tightened position and the knob handle 36 is pivoted downwardly forcing the engagement points 44 radially outwardly of the confines of the knob 34 and into engagement with the corresponding engagement points 46 in the clutch cover, thereby securing the knob 35 in the tightened position.

It will be understood based on the foregoing, that the retaining assembly of the invention can be employed with tensioning arrangements other than as described above. For example, the retaining assembly of the invention can be used in the absence of a spring-biased cam and associated elements automatically move the guide bar to a new position. In that case, the guide bar can be repositioned by the operator grasping and moving the bar.

The present invention can provide various advantages. For example, the present invention can enable an operator to make adjustments to the guide bar without additional tools. Additionally, the present invention provides for a positive securing of the knob against unwanted rotational movement while allowing for the ready release of the knob when rotational movement is desired.

From the above description of the invention, those skilled in the art will perceive improvements, changes and modifications in the invention. Such improvements, changes and modifications are intended to be covered by the appended claims.

What is claimed is:

1. A chain saw having a retaining assembly for a tensioning arrangement for adjusting the tension of a cutting chain, the chain saw having an engine chassis, a clutch cover, and a guide bar for the cutting chain, the retaining assembly comprising:

a rotatable knob operatively cooperative with the engine chassis, the clutch cover, and the guide bar, wherein the knob may be rotated about a rotational axis between a tightened position, in which the guide bar is fixed in place between the engine chassis and the clutch cover, and a loosened position, in which the guide bar is loosened and may be repositioned using the tensioning arrangement so as to adjust the tension of the cutting chain on the guide bar;

a plurality of engagement points fixed relative to the clutch cover; and a locking mechanism connected to the rotatable knob for alternatively locking the rotatable knob against rotation about its rotational axis and unlocking the rotatable knob to enable the rotatable knob to be rotated about its rotational axis, the locking mechanism including a plurality of moveable engagement points and means for moving the movable engagement points alternatively outwardly and inwardly of the confines of the rotatable knob into and out of engagement, respectively, with the engagement points fixed relative to the clutch cover;

wherein the means for moving the movable engagement points moves the movable engagement points alternatively radially outwardly and inwardly of, and substantially perpendicularly to, the rotational axis of the rotatable knob into and out of engagement, respectively, with the engagement points fixed relative to the clutch cover; and wherein the locking mechanism includes a lock on which the moveable engagement points are located, the lock being slidably mounted within the rotatable knob for alternative movement radially outwardly and inwardly of, and substantially perpendicularly to, the rotational axis of the rotatable knob, whereby the movable engagement points are, respectively, extended beyond the confines of the rotatable knob and into engagement with the engagement points fixed relative to the clutch cover and retracted within the confines of the rotatable knob and out of engagement with the engagement points fixed relative to the clutch cover.

2. The chain saw of claim 1, wherein the locking mechanism further includes a lever having a portion in contact with the lock, the lever being mounted to the rotatable knob such that movement of the lever in a first direction causes the portion of the lever in contact with the lock to move the lock radially outwardly of the rotational axis of the rotatable knob, whereby the moveable engagement points on the lock are placed into engagement with the engagement points fixed relative to the clutch cover, and movement of the lever in a second direction causes the portion of the lever in contact with the lock to move radially inwardly of the rotational axis of the rotatable knob, whereby the lock also moves radially inwardly of the rotational axis of the rotatable knob to take the moveable engagement points on the lock out of engagement with the engagement points fixed relative to the clutch cover.

3. The chain saw of claim 2, wherein the lever has an end portion pivotally connected to the rotatable knob for pivotal movement of the lever between the first direction and the second direction, and the portion of the lever in contact with the lock comprises a cam that moves the lock radially outwardly of the rotational axis of the rotatable knob and disposes the moveable engagement points on the lock into engagement with the engagement points fixed relative to the clutch cover when the lever is moved in the first direction and allows the lock to move radially inwardly of the rotational axis of the rotatable knob to dispose the moveable engagement points on the lock out of engagement with the engagement points fixed relative to the clutch cover when the lever is moved in the second direction.

4. The chain saw of claim 3, including a resilient means in contact with the lock and the rotatable knob for continually urging the lock inwardly radially of the rotational axis of the rotatable knob.

5. The chain saw of claim 1, 2, 3 or 4 wherein the moveable engagement points are slidably positioned on the lock for independent movement in relation to the lock in the same radial outward and radial inward direction as the radial outward and radial inward movement of the lock, and resilient means in contact with the lock and the moveable engagement points for continually urging the moveable engagement points in said radial outward direction in relation to the lock.

6. A chain saw having a retaining assembly for a tensioning arrangement for adjusting the tension of a cuffing chain, the chain saw having an engine chassis, a clutch cover, and a guide bar for the cuffing chain, the retaining assembly comprising:

- a rotatable knob operatively cooperative with the engine chassis, the clutch cover, and the guide bar, wherein the knob may be rotated about a rotational axis between a tightened position, in which the guide bar is fixed in place between the engine chassis and the clutch cover, and a loosened position, in which the guide bar is loosened and may be repositioned using the tensioning arrangement so as to adjust the tension of the cuffing chain on the guide bar, and wherein the rotatable knob includes a radially outermost peripheral wall;
- a plurality of engagement points fixed relative to the clutch cover; and
- a locking mechanism connected to the rotatable knob for alternatively locking the rotatable knob against rotation about its rotational axis and unlocking the rotatable knob to enable the rotatable knob to be rotated about its rotational axis, the locking mechanism including a plurality of moveable engagement points and means for moving the movable engagement points alternatively outwardly for locking, wherein the movable engagement points are located outside of the peripheral wall of the rotatable knob, and inwardly for unlocking, of the confines of the rotatable knob into and out of engagement, respectively, with the engagement points fixed relative to the clutch cover,
- wherein the means for moving the movable engagement points moves the movable engagement points alternatively radially outwardly and inwardly of the rotational axis of the rotatable knob into and out engagement, respectively, with the engagement points fixed relative to the clutch cover, and
- wherein the locking mechanism includes a lock on which the moveable engagement points are located, the lock being slidably mounted within the rotatable knob for alternative movement radially outwardly and inwardly of the rotational axis of the rotatable knob, whereby the movable engagement points are, respectively, extended beyond the confines of the rotatable knob and into engagement with the engagement points fixed relative to the clutch cover and retracted within the confines of the rotatable knob and out of engagement with the engagement points fixed relative to the clutch cover.

7. The chain saw of claim 6, wherein the means for moving the movable engagement points moves the movable engagement points substantially perpendicularly to the rotational axis of the rotatable knob into and out engagement, respectively, with the engagement points fixed relative to the clutch cover.

8. The chain saw of claim 7, wherein the lock is slidably mounted within the rotatable knob for alternative movement radially outwardly and inwardly of, and substantially perpendicularly to, the rotational axis of the rotatable knob.

9. The chain saw of claim 6, wherein the locking mechanism further includes a lever having a portion in contact with the lock, the lever being mounted to the rotatable knob such that movement of the lever in a first direction causes the portion of the lever in contact with the lock to move the lock radially outwardly of the rotational axis of the rotatable knob, whereby the moveable engagement points on the lock are placed into engagement with the engagement points fixed relative to the clutch cover, and movement of the lever in a second direction causes the portion of the lever in contact with the lock to move radially inwardly of the rotational axis of the rotatable knob, whereby the lock also moves radially inwardly of the rotational axis of the rotatable knob to take the moveable engagement points on the lock out of engagement with the engagement points fixed relative to the clutch cover.

10. The chain saw of claim 9, wherein the lever has an end portion pivotally connected to the rotatable knob for pivotal movement of the lever between the first direction and the second direction, and the portion of the lever in contact with the lock comprises a cam that moves the lock radially outwardly of the rotational axis of the rotatable knob and disposes the moveable engagement points on the lock into engagement with the engagement points fixed relative to the clutch cover when the lever is moved in the first direction and allows the lock to move radially inwardly of the rotational axis of the rotatable knob to dispose the moveable engagement points on the lock out of engagement with the engagement points fixed relative to the clutch cover when the lever is moved in the second direction.

11. The chain saw of claim 10, including a resilient means in contact with the lock and the rotatable knob for continually urging the lock inwardly radially of the rotational axis of the rotatable knob.

12. The chain saw of claim 11, wherein the moveable engagement points are slidably positioned on the lock for independent movement in relation to the lock in the same radial outward and radial inward direction as the radial outward and radial inward movement of the lock, and resilient means in contact with the lock and the moveable engagement points for continually urging the moveable engagement points in said radial outward direction in relation to the lock.

13. A chain saw having a retaining assembly for a tensioning arrangement for adjusting the tension of a cutting chain, the chain saw having an engine chassis, a clutch cover, and a guide bar for the cutting chain, the retaining assembly comprising:

a rotatable knob operatively cooperative with the engine chassis, the clutch cover, and the guide bar, wherein the knob may be rotated about a rotational axis between a tightened position, in which the guide bar is fixed in place between the engine chassis and the clutch cover, and a loosened position, in which the guide bar is loosened and may be repositioned using the tensioning arrangement so as to adjust the tension of the cutting chain on the guide bar, and wherein the rotatable knob includes a radially outermost peripheral wall;

a plurality of engagement points fixed relative to the clutch cover; and a locking mechanism connected to the rotatable knob for alternatively locking the rotatable knob against rotation about its rotational axis and unlocking the rotatable knob to enable the rotatable knob to be rotated about its rotational axis, the locking mechanism including a plurality of moveable engagement points and means for moving the movable engagement points alternatively outwardly and inwardly of the confines of the rotatable knob into and out of engagement, respectively, with the engagement points fixed relative to the clutch cover, wherein during locking of the rotatable knob against rotation the movable engagement points are located outside of the peripheral wall of the rotatable knob, wherein the locking mechanism includes a lock and a floating support slidably mounted on the lock, the moveable engagement points being located on the floating support, and wherein the lock is slidably mounted within the rotatable knob for alternative movement radially outwardly and inwardly of, and substantially perpendicularly to, the rotational axis of the knob, the lock being operatively connected to the floating support whereby the movable engagement points are, respectively, extended beyond the confines of the rotatable knob and into engagement with the engagement points fixed relative to the clutch cover and retracted within the confines of the rotatable knob and out of engagement with the engagement points fixed relative to the clutch cover.

14. The chain saw of claim 13, wherein the lock further includes an anchoring pin and a spring connected to the anchoring pin, the spring having an end connected to an arm of the floating support for biasing the floating support in a direction radially outwardly of the lock.

15. The chain saw of claim 13, wherein the locking mechanism further includes a lever having a portion in contact with the lock, the lever being mounted to the rotatable knob such that movement of the lever in a first direction causes the portion of the lever in contact with the lock to move the lock radially outwardly of the rotational axis of the rotatable knob, whereby the moveable engagement points on the floating support are placed into engagement with the engagement points fixed relative to the clutch cover, and movement of the lever in a second direction causes the portion of the lever in contact with the lock to move radially inwardly of the rotational axis of the rotatable knob, whereby the lock also moves radially inwardly of the rotational axis of the rotatable knob to take the moveable engagement points on the floating support out of engagement with the engagement points fixed relative to the clutch cover.

16. The chain saw of claim 13, including a resilient means in contact with the lock and the rotatable knob for continually urging the lock inwardly radially of the rotational axis of the rotatable knob.

* * * * *